R. R. THOMPSON.
SIGNAL.
APPLICATION FILED APR. 5, 1915.
1,189,183.
Patented June 27, 1916.
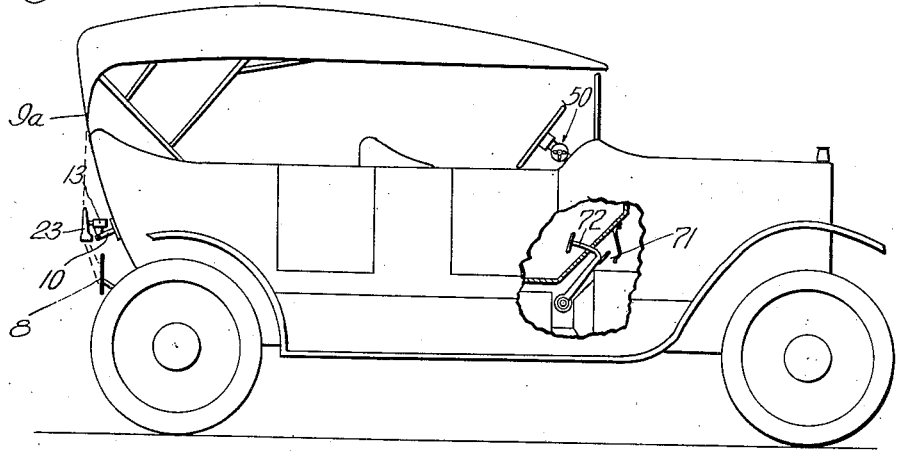
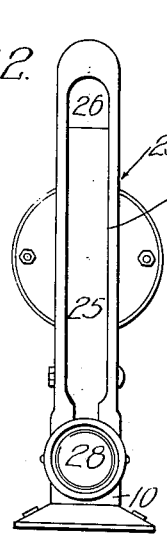
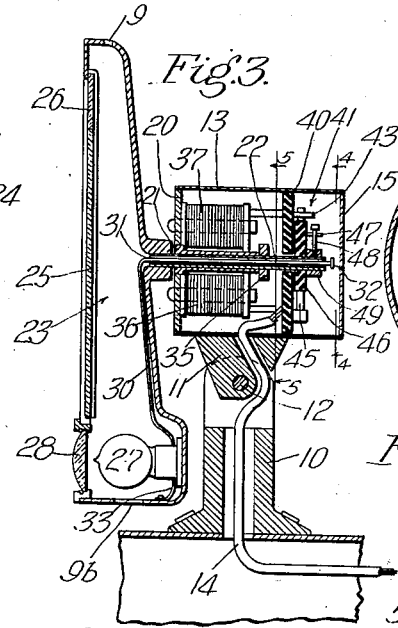
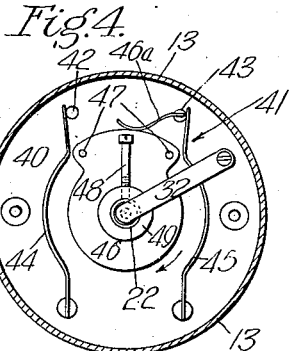
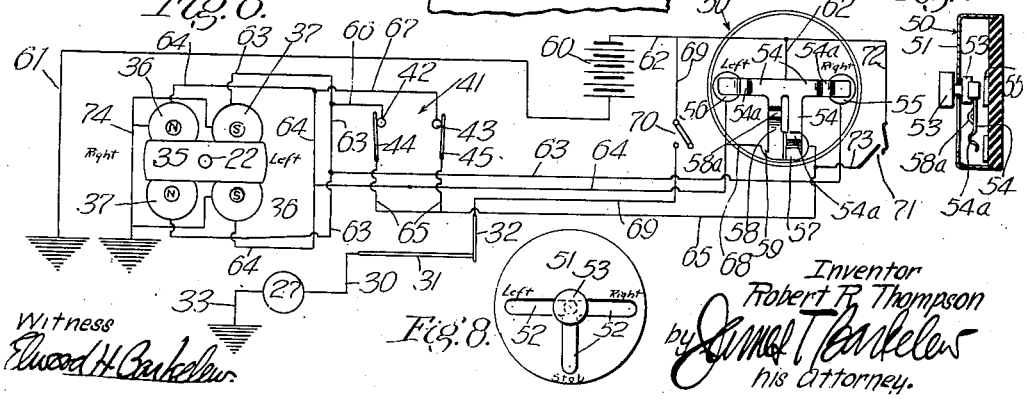
Witness
Elwood H. Barkelew
Inventor
Robert R. Thompson
by James T. Barkelew
his attorney.

UNITED STATES PATENT OFFICE.

ROBERT R. THOMPSON, OF LOS ANGELES, CALIFORNIA.

SIGNAL.

1,189,183.  Specification of Letters Patent.  Patented June 27, 1916.

Application filed April 5, 1915. Serial No. 19,138.

*To all whom it may concern:*

Be it known that I, ROBERT R. THOMPSON, a citizen of the United States, residing at Los Angeles, in the county of Los Angeles, State of California, have invented new and useful Improvements in Signals, of which the following is a specification.

This invention relates to signals adapted particularly for use on automobiles and the like, although I do not specifically restrict my device to this particular use; and it is an object of the invention to provide a relatively simple and inexpensive signal means which will give distinctive and readily understood signal indications when the driver intends to turn to the right or left, or intends to stop.

It is an object of this invention to provide a signal which will give indications needing no explanation; indications which do not need, for instance the showing of the printed words, "Right," "Left" or "Stop;" indications which are commanding and unequivocal in themselves.

A specific form of mechanism embodying my invention may be explained as follows: I employ an elongate signal member which I term a semaphore, mounted upon a horizontal shaft in such manner as to normally hang vertically. This elongate signal member preferably comprises a light chamber having a lamp preferably at its lower end. The face of the chamber of the face is open and a distinctively colored transparency such as a colored glass is placed in the elongate opening above the lamp; while immediately opposite the lamp I place a lens; so that the result when the lamp is illuminated is a spot light below and a line of light above. I employ electro-magnetic means for displacing the shaft and signal member in either direction from normal position, said means including a manually operable switch. And I also employ the same electro-magnetic means for continuously oscillating the shaft and signal member back and forth, said continuous oscillation indicating that the automobile is about to change its speed or about to stop.

There are various particular and specific features of my invention which I explain in the following specification, reference being had to the accompanying drawings, in which, for the purpose of this specification, I have illustrated a specific form of mechanism embodying my invention, and in which drawings—

Figure 1 is a view showing the adaptation of my signal to an automobile, Fig. 2 is a rear view of the signal mechanism, Fig. 3 is a longitudinal vertical section of the same, Fig. 4 is an enlarged section taken as indicated by line 4—4 of Fig. 3, Fig. 5 is a section taken as indicated by line 5—5 of Fig. 3, Fig. 6 is a diagram illustrating the electrical action of my signal mechanism, Fig. 7 is a section showing the construction of my preferred form of control switch, and Fig. 8 is a face view of said switch.

In the drawings the numeral 10 designates a suitable base upon which my signal mechanism is mounted, said base being adapted for mounting upon either the fender or body of an automobile. In Fig. 1 I have shown the device mounted upon the rear of the body of an automobile. A bracket 11 is pivotally attached at 12 to the base, so that the case or body 13 of the device may be held in a horizontal position regardless of the position of the base 10. The base 10 is preferably hollow to afford passage of the cable 14 which carries the electric wires to the mechanism contained within the body 13. The body 13 is preferably cylindrical in form and is made with a permanent end wall 15. The mechanism of the device is inserted in the body 13 and may be removed therefrom for inspection, adjustment or repair. A removable head 20 carries a bearing sleeve 21 in which a hollow shaft 22 is mounted. The signal member 23 is carried on the outer end of this hollow shaft and hangs normally vertically therefrom. The signal member is preferably in the form of an elongate chamber of the configuration illustrated having an elongate opening 24 on its face, in which opening I preferably place a distinctively colored glass, or two distinctively colored glasses, such as a red glass 25 and a green glass 26. In the lower part of the chamber I place an electric lamp 27 and immediately opposite the lamp there is a lens 28. The interior of the light chamber is coated with some reflective substance, so that the whole interior is flooded with light from the lamp 27. It will be noted that the light chamber is upwardly tapered in shape, and that the rear wall is not vertical but is placed at an angle; so that light from the lamp may be directly reflected by the rear wall onto the colored glass in the front face. When the lamp is illuminated, the appearance is that of a line of light of distinctive color and a spot light below the line of light. The spot light is red, the lens 28 being preferably red. When the upper end of the signal member is turned toward the right, indication is given that the automobile intends to turn toward the right. Similarly, when the automobile is about to turn to the left, the upper end of the signal member is thrown to the left. Current for the lamp is conducted through a wire 30 which connects with a conductor 31 extending through the hollow shaft 22. A contact finger 32 engages the other end of the conductor 31. A wire 33 leading from the other side of the lamp may be grounded on the signal member at any convenient point. I may provide an opening 9 in the upper end of the light compartment, through which a spot of light may be thrown onto the back of the automobile at $9^a$; and I also may provide an opening $9^b$ through which the number plate 8 may be illuminated. The spot of light will move accordingly to the movement of member 23.

Within the body or casing 13 I mount an armature 35 upon the shaft 22; and I place preferably two pairs of magnets 36 and 37 in the relative positions shown, so that energization of one pair of magnets will attract the armature in one direction and energization of the other pair will attract the armature in the opposite direction. I employ manually operable means for energizing either pair of magnets at will, as is hereinafter explained.

In the back part of the body 13 I place a disk 40 of insulating material which forms the base for a switch mechanism 41. This switch mechanism comprises the following described parts; I utilize two stationary contacts 42 and 43 adapted normally to be engaged by contact fingers 44 and 45, respectively. A cam 46 is mounted loosely upon the shaft 22, carrying two pins 47 adapted to be engaged by a screw or other member 48 which moves with the shaft 22. This screw 48 is preferably adjustably mounted upon the shaft 22, being a set screw for a collar 49. When the shaft 22 moves in one direction, the screw 48 will engage with one of the pins 47 and move the cam 46 to move the contact finger on that side to disengage it from its contact. Normally both the contact fingers 44 and 45 are in engagement with their contacts 42 and 43. When it is desired to continuously oscillate the signal member, current is supplied to both of the contact fingers 44 and 45, and thence through them to the contacts 42 and 43 which are connected to the respective sets of electro-magnets 36 and 37. The operation, which will hereinafter be described in detail, includes the alternate raising of the two contact fingers off their respective contacts, thus alternating making and breaking the circuit to the two sets of electro-magnets and causing the armature 35 to be oscillated back and forth. Spring $46^a$ bears on cam 46 to normally hold it still.

Referring now particularly to Figs. 6, 7 and 8, I describe my preferred form of manually operable switch by which the driver controls the signal mechanism. This switch, generally designated by the numeral 50 may be mounted in any convenient position upon the automobile, as on the steering post as shown in Fig. 1. The casing 51 of the switch has a T-shaped slot 52 in its face which holds a button 53, so that the button may be moved either to the right or left or may be moved downwardly. Within the case there are three spring contact fingers 54 extending to the right and left and downwardly, respectively, and these fingers have raised portions $54^a$ which the interior part of the button 53 is adapted to engage, and, by engaging them, to press the contacts down into engagement with stationary contacts 55, 56 and 57. There is also another spring contact finger 58 having a raised portion $58^a$, over which raised portion $58^a$ the button 53 must travel before it reaches the raised portion $54^a$ of spring contact finger 54; and in passing over the raised portion $58^a$ the button causes the contact finger 58 to engage with the stationary contact 59.

I may use any suitable source of electric current, as a battery 60, which is grounded on one side, as at 61. A wire 62 leads from the other side of the battery to the switch fingers 54 and 58. From the stationary contact 55 wires 63 lead to the magnets 37; and from the stationary contact 56 wires 64 lead to magnets 36. Wire 65 leads from stationary contact 57 to the contact fingers 44 and 45; and wires 66 and 67 lead from stationary contacts 42 and 43, respectively, to wires 63 and 64 respectively, and thence through wires 63 and 64 to the magnets 37 and 36, respectively. A wire 68 joins the stationary switch contact 59 with the wires 64 which lead to magnets 36, these being the magnets which throw the upper end of the signal member to the left. A wire 69 leads from battery wire 62 to the contact finger 32, thus establishing a circuit to the lamp 27, said wire 69 being controlled by a switch 70 placed in any convenient position upon the automobile. A switch 71 may be placed to be operated by the clutch pedal 72 of the automobile, and said switch 71 is connected by wires 72 and 73 between the battery 62 and the wire 65 leading to the contact fingers 44 and 45. Closure of the switch 71 will effect the same operation as closure of the switch 54, 57, causing continuous oscillation of the signal member to indicate a stop or change of speed of the automobile.

The operation of the device is as follows. When the driver desired to turn to the left, he moves the push button 53 to the left, causing the finger 54 to engage the contact 56. This establishes a circuit as follows. From the battery 60, through wire 62, contact finger 54, contact 56, wires 64, electro-magnets 36, and wires 74 to the ground and thence back to the battery. When the driver desires to turn to the right he moves the button 53 to the right, pressing the contact finger into engagement with contact 55 and establishes a circuit as follows: from the battery 60, through wire 62, contact finger 54, contact 55, wires 63, electro-magnets 37, and wires 74 to the ground and thence back to the battery. The energization of the respective sets of magnets will move the signal member to the corresponding position moving the upper end of the signal member to the right or left according as the switch button is moved to right or left. It is a feature of my combination that the semaphore signal member is moved in a direction corresponding to the direction in which the switch button is moved. When it is desired to stop, or change the speed of the automobile, the operator moves the button 53 downwardly. This movement causes the contact finger 58 to first engage the contact 59, which causes momentarily the same operation of the device as when the button is moved to the left. Momentarily the magnets 36 are energized and the signal member is thrown to the left far enough to move the cam 46 in the direction indicated so as to throw the contact finger 45 out of engagement with its contact 43. As the button 53 is moved on downwardly, it throws the contact finger 54 into engagement with the stationary contact 57 and a circuit is established as follows: from the battery 60, through the wire 62, contact finger 54, contact 57, wire 65, contact finger 44, contact 42, (contact 45 being out of engagement with contact 43) wires 66 and 63 to the magnets 37, and thence through wires 74 and the ground and wire 61 to battery 60. Energization of the magnets 37 draws the armature 35 in such a direction as to throw the signal member 23 to the right (throwing the upper end of the signal member to the left in Fig. 6, this figure being arranged looking rearwardly at the mechanism). Movement of the signal member to the right will cause the movement of the cam 46 in the direction opposite to that indicated in Fig. 4, causing the contact finger 45 to resume engagement with contact 43 and lifting contact finger 44 off the contact finger 42. When this has been done, the magnets 36 are energized and the armature and the signal member are moved back again in the opposite direction.

This operation is kept up until the button 53 is moved back to its normal position. It will be seen that the function of contact finger 58 is to throw the armature 35 initially to one side or the other so as to throw one of the contact fingers 44 or 45 out of engagement with the corresponding contact 42 or 43, thus enabling the oscillating operation to positively start when the button 53 is moved on downwardly and the contact finger 54 is thrown into engagement with the contact 57. But it will be understood that this initial actuation of the armature is not necessarily caused by the switch action just described. I have found in practice that the vibration of the automobile body is sufficient to vibrate the armature slightly from one side to the other so as to throw it closer to one set of magnets than to the other; with the usual result that when the switch 54, 57 or 71 is closed the oscillation will ensue as described.

I wish to particularly emphasize the character of the signal member or semaphore; the combination of means to displace the signal member to one side or the other or to oscillate it; and the construction of the manual control switch and its coöperation with the other parts of the mechanism.

Having described a preferred form of my invention, I claim:

1. In combination, a frame, a horizontal shaft thereon, an elongate signal member mounted on said shaft to hang normally vertically, electro-magnetic means for displacing and holding said shaft and signal member in either direction from normal position and for continuously oscillating said shaft and member back and forth, said means including a switch with a manually movable button, said button being movable to three positions, one to the right hand and one to the left and one below, and contacts arranged to be engaged by said manually movable button when it is moved to one of its three positions.

2. In combination, a frame, a horizontal shaft thereon, an elongate signal member mounted on said shaft to hang normally vertically, an armature mounted on said shaft, a pair of magnets arranged one to attract the armature in one direction and the other to attract the armature in the opposite direction, means including electrical circuits and switches for continuously energizing either of said magnets, and means for continuously oscillating said armature and shaft and signal member including a switch mechanism operated by the operation of the shaft and including a manually operable switch.

3. In combination, a frame, a horizontal shaft thereon, an elongate signal member mounted on said shaft to hang normally vertically, an armature on said shaft, a pair of magnets arranged one to attract the armature in one direction and the other to attract said armature in the opposite direction, a switch mechanism operated by the oscillation of said shaft, said mechanism including a pair of contacts and a pair of movable contact fingers engaging therewith, and a cam adapted to move said contact fingers, electrical circuits and manually operable switch means for energizing either of said magnets independent of said switch mechanism, and means for energizing said magnets through said switch mechanism including electrical circuits and a manually operable switch.

4. In combination, a frame, a horizontal shaft thereon, an elongate signal member mounted on said shaft to hang normally vertically therefrom, electro-magnetic means for displacing and holding the shaft and signal member in either direction from normal position, switch means for energizing the electro-magnetic means to displace and hold the signal member in either direction at will, automatic switch mechanism operated by the shaft to connect the electro-magnetic means alternately for displacing the shaft and signal member in opposite directions, and a manually operated switch adapted to connect an electrical source to said automatic switch.

5. In combination, a frame, a horizontal shaft thereon, an elongate signal member mounted on the shaft to hang normally in a vertical position, an armature on said shaft, a pair of electro-magnets adapted to individually attract the armature in opposite directions to throw the signal member to opposite positions displaced from normal, switch means embodying a pair of switches, and means operated by the shaft to alternately open and close the switches, said switches being individually connected with the said electro-magnets, manually operable switches to supply current to either electro-magnet independently of said pair of switches so as to continuously energize either of said electro-magnets and draw and hold the armature in either direction from its normal position, and a manually operable switch to supply current to both switches of said pair simultaneously.

6. In combination, a frame, a horizontal shaft thereon, an elongate signal member mounted on the shaft to hang normally in a vertical position, an armature on said shaft, a pair of electro-magnets adapted to individually attract the armature in opposite directions to throw the signal member to opposite positions displaced from normal, switch means embodying a pair of switches, and means operated by the shaft to alternately open and close the switches, said switches being individually connected with the said electro-magnets, manually operable switches to supply current to either switch of said pair and thence to either electro-magnet, and a manually operable switch adapted to first supply current to one of the switches of said pair and then to supply current to both switches of said pair.

7. A visual signal, embodying in combination a frame, a horizontal pivot thereon, a signal member and an armature on the shaft, said signal member adapted to normally hang in a vertical position, a pair of electro-magnets placed in such relation to the armature that one of them will attract the armature to incline the signal member on one side of its normal position and the other will attract the armature to incline the signal member to the opposite side of its normal position, manually controllable means to continuously energize either magnet to displace the signal member and hold it displaced, and manually controllable means to alternately energize said magnets to cause oscillating movements of the armature and signal member.

8. A visual signal, embodying in combination a frame, a movable signal member pivoted thereon to normally hang vertically, a pair of electro-magnetic means one adapted to incline the signal member in one direction and the other to incline the signal member in the opposite direction, a switch mechanism operated by oscillating movement of the signal member to alternately make connection to the two electro-magnetic means, means manually controllable to energize the electro-magnets through said switch mechanism, and means manually controllable to energize either of the magnets independently of the other and independently of the switch mechanism.

In witness that I claim the foregoing I have hereunto subscribed my name this 27th day of March 1915.

ROBERT R. THOMPSON.

Witnesses:
JAMES T. BARKELEW,
ELWOOD H. BARKELEW.